United States Patent

Ladouce

Patent Number: 5,269,669
Date of Patent: Dec. 14, 1993

[54] TIRE MOLD

[75] Inventor: Jean-Pierre Ladouce, Clermont-Ferrand, France

[73] Assignee: Compagnie Generale des Etablissements Michelin - Michelin & Cie, Clermont-Ferrand Cedex, France

[21] Appl. No.: 908,303

[22] Filed: Jul. 2, 1992

[30] Foreign Application Priority Data

Jul. 10, 1991 [FR] France .................. 91 08789

[51] Int. Cl.⁵ .................................. B29C 35/00
[52] U.S. Cl. ......................... 425/47; 425/55; 425/192 R; 425/451.9; 249/57
[58] Field of Search ........ 425/47, 35, 451.9, DIG. 44, 425/49, 56, 54, 55, 192 R; 249/56, 57, 160, 161, 162

[56] References Cited

U.S. PATENT DOCUMENTS

| 3,609,819 | 5/1971 | Searle | 425/49 |
| 4,726,749 | 2/1988 | Katsumata | 425/54 |

FOREIGN PATENT DOCUMENTS

| 2113698 | 9/1972 | Fed. Rep. of Germany . |
| 60-78711 | 5/1985 | Japan .................. 425/47 |
| 60-79915 | 5/1985 | Japan .................. 425/47 |

Primary Examiner—Khanh P. Nguyen
Attorney, Agent, or Firm—Brumbaugh, Graves, Donohue & Raymond

[57] ABSTRACT

A tire mold including a pair of shells (2) for molding the side walls of the tire and a ring or sectors (1) for molding the tread of the tire and in which each sector (1) of the mold includes an outer support (10) and an inner mold fitting (11). The contact of the sectors with each other and of the sectors on each side wall molding shell (2) takes place via segments (3) of small cross section, compressed elastically upon the closing of the mold, so as to assure complete tightness of the mold.

5 Claims, 4 Drawing Sheets

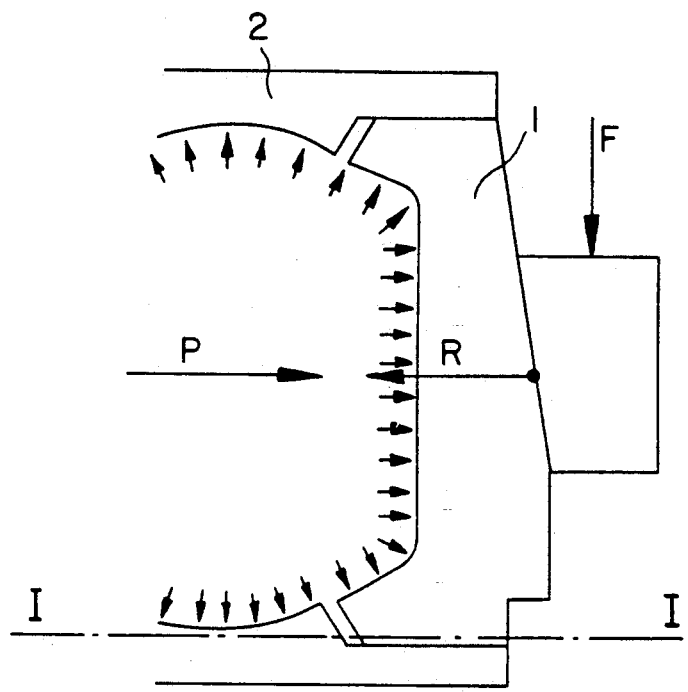
FIG. I
(PRIOR ART)
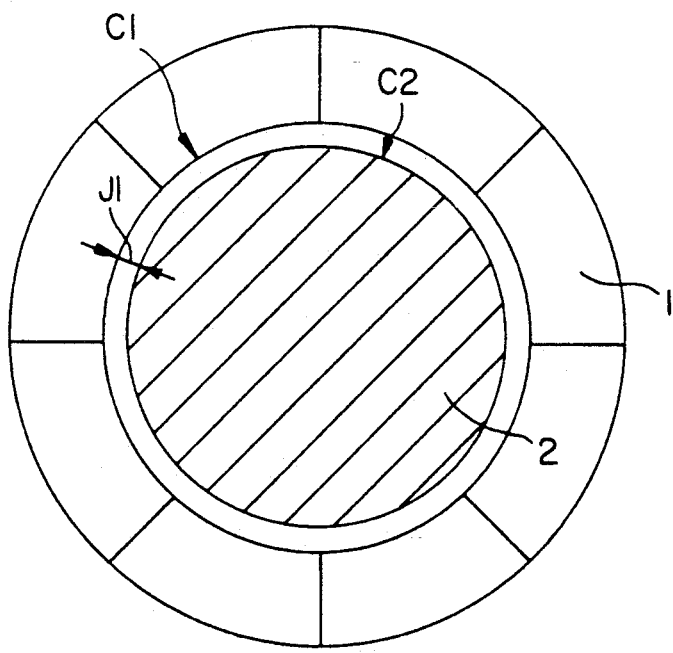
FIG. 2
(PRIOR ART)

TIRE MOLD

BACKGROUND OF THE INVENTION

The present invention relates to molds for tires and more particularly molds of the sector type. In this type of mold, the molding space for the outer surface of the tire is defined by two shells, each assuring the molding of a side wall, and by a ring of sectors assuring the molding of the tread.

The manufacture of tires, and more particularly the vulcanization phase, requires placing the tire blank under pressure and supplying heat to it.

The "sector" type curing molds are made of several parts assembled and operated by a suitable kinematic system which is well known to those skilled in the art. One example thereof is given in U.S. Pat. No. 3,797,979.

During the vulcanization, a certain pressure is exerted on the material to be molded (raw rubber), which, furthermore, experiences a substantial decrease in viscosity produced by the increase in temperature. Ideally, in order to avoid mold burrs, the joint planes of the curing mold should remain tight or have a clearance less than or equal to the small amount of clearance permitted by the physical properties of the rubber mixes at the time of the vulcanization (a few one-hundredths of a millimeter, on the order of 0.03 mm). The term "joint planes", as used herein, refers to the interfaces between each integral unit constituting the mold, namely the shells and the sectors.

Unfortunately, this tightness is generally insufficient in actual practice and molding defects occur, known as "molding burrs", formed of rubber which has worked its way into the interfaces present between sectors and between shells and sectors.

This problem in the present state of the art is illustrated in FIGS. 1 to 3 of the accompanying drawings, in which FIG. 1 is a section through a meridian plane of a known sector mold, showing a sector 1 and the side shells 2, and FIGS. 2 and 3 are a section through the plane I of FIG. 1 perpendicular to the axis of the mold, diagrammatically indicating two types of configurations which these sector molds have in actual practice.

The present design of the molds can be compared with a cylinder which is split into sectors which are subjected at the same time to internal and external pressures. We will refer to the imaginary circle drawn at the interface with a side shell 2 measured below the ring of sectors 1 when all the sectors 1 are in contact with each other in the circumferential direction as the "embedment circle" $C_1$. The corresponding circle measured on the shell 2 will be referred to as the shell circle $C_2$. The expression "circle" is intentionally used, since this interface is either cylindrical or frustoconical, as in the figures. Technically, one can speak of a circle only for one given axial position, but this technical detail is without importance for an understanding of the problem raised and the solution contributed by the invention.

In the case of FIG. 2, the embedment circle $C_1$ is larger than the shell circle $C_2$. Upon the closing of the mold, there is no play between sectors 1. Radial play $J_1$ is present between the embedment circle $C_1$ drawn on the ring of sectors 1 and the shell circle $C_2$.

In the case of FIG. 3, the sector embedment circle $C_1$ which could have been measured if the sectors could have been brought into contact with each other would be shorter than the shell circle $C_2$. This movement together is impossible, since the sectors 1 first come into contact with the shells. A clearance $J_2$ remains between the sectors 1 abutting against the shell. There is, therefore, no clearance between a sector 1 and the shell 2. It is only in the theoretical intermediate case contained between the configuration illustrated in FIG. 2 and that illustrated in FIG. 3 that one could have total tightness of the mold.

SUMMARY OF THE INVENTION

The invention proposes solving this problem by making the ring of sectors 1 compressible circumferentially under the effect of the hooping force of said ring imparted by the vulcanization press.

The tire mold in accordance with the invention, which is formed of two shells each assuring the molding of one side wall of the tire, and of a ring of sectors assuring the molding of the tread of the tire, each sector having a support and a mold fitting fastened to the support by fastening means, said fitting being located radially to the inside of the support, the sectors of which ring, in closed position of said mold, are all in contact, two by two, in the circumferential direction via the mold fittings and in contact with the shells by their side ends, is characterized by the fact that each sector has two segments of the shape of a circular arc, each segment being fastened on one of the respective side ends of the support, so that, in the closed position of the said mold:

(1) the sectors are necessarily in contact with each other via said segments and never via the supports,
(2) the contact between sectors and shells is assured solely via the segments,
(3) all the segments are under compression by their resting against each other.

DESCRIPTION OF THE DRAWINGS

FIGS. 1, 2 and 3, as described above, illustrate problems encountered in molding tires, FIG. 1 being a meridian section through a conventional mold and FIGS. 2 and 3 being sections through plane I of FIG. 1 illustrating two configurations which produces the problem.

FIG. 4 is a meridian section through a mold in accordance with the invention.

FIG. 5 is a section along the line V—V in FIG. 4.

FIG. 6 illustrates a detail of the mold according to the invention.

FIG. 7 is a section along the line VII—VII of FIG. 6.

FIG. 8 illustrates another detail of the mold.

DESCRIPTION OF PREFERRED EMBODIMENTS

Figure 3:
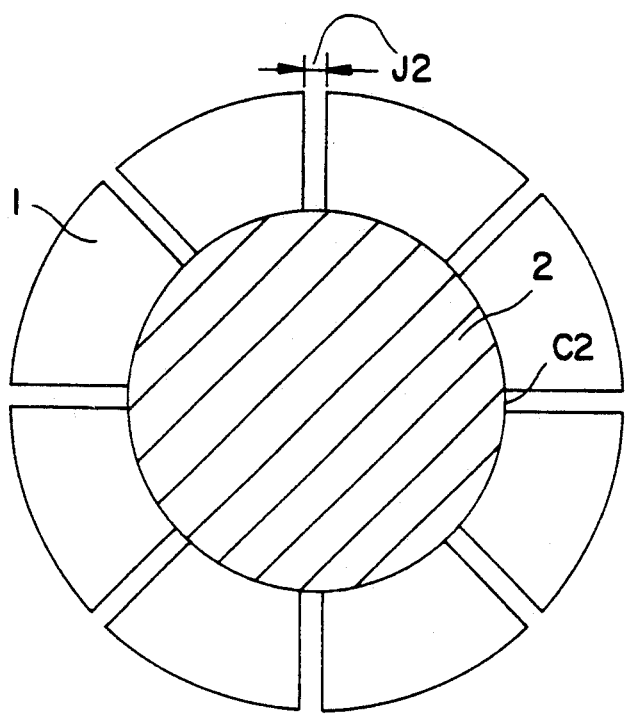
Figure 4:
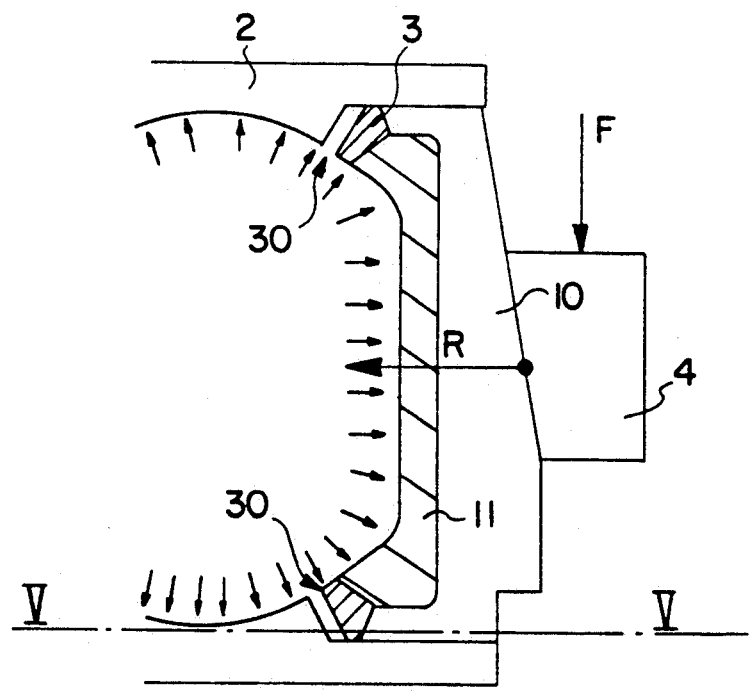
FIGS. 4 through 8 show the solution to the problem as proposed by the invention.

In FIG. 4, it is seen that a sector 1 comprises a support 10 and a mold fitting 11, generally of aluminum. The latter is advantageously held on the support 10 by the segments 3, which thus assure the fastening of the mold fitting on the support. The segments 3 are therefore fastened on the support 10 and clamp the fitting 11. From FIG. 5 it can be seen that the supports 10 are not in contact with each other. There is still a clearance $J_{10}$ between supports.

The principle of the mold in accordance with the invention consists in being able elastically to decrease the circumference of the embedment circle $C_1$ until it coincides with the shell circle $C_2$, by using the forces available in the press in which the mold is mounted, applied to the ring of sectors by a hoop 4 acting on a frustoconical surface, or by any other device of equivalent effect.

Figure 5:
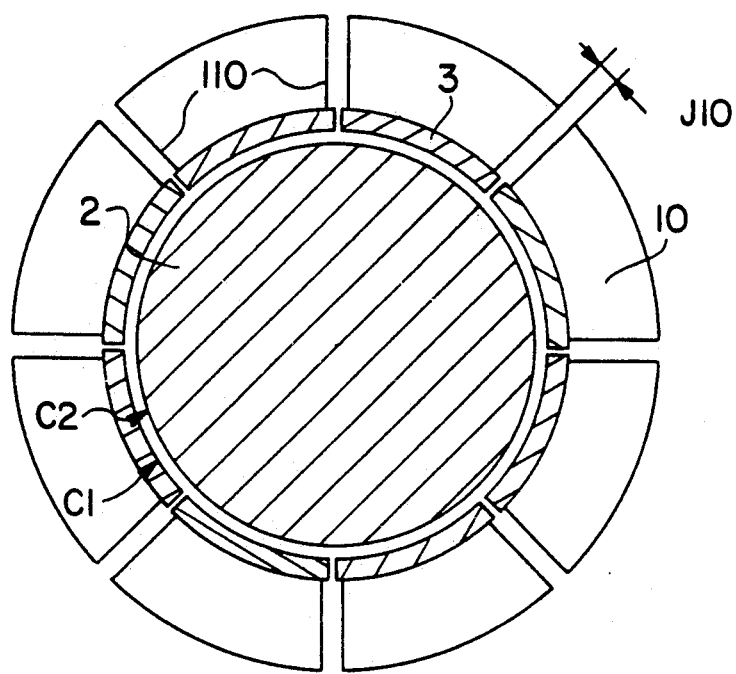

For this, it is necessary to decrease the circumferential stiffness of the cylinder constituting the ring of sectors 1 by decreasing the cross section S thereof participating in the circumferential force, due to segments 3 which, placed end to end, constitute two rings of small cross section (see FIGS. 4 and 5). The segments 3 constituting the side rings are compressed, a clearance $J_{10}$ being provided between the supports 10, which, therefore, are never placed under compression via their faces 110.

Under the action of the force F which, via the hoop 4, produces a resultant radial force R, the segments 3, in contact on their ends, are compressed in the same way as a tube subjected to an external pressure would be. The shortening of the segments 3 permits the advance of the supports 10 which are not in contact with each other, until the segments rest on the shells 2.

All the mold fittings 11 which bear the negative of the sculpturing of the tread are so dimensioned that they also are compressed circumferentially at least upon the first closing of the mold. In circumferential direction, preferably, they therefore protrude slightly on both sides of each segment 3.

In this example, as in most embodiments of tire molds, the mold fittings 11 are made in the foundry from an aluminum alloy, and all the other parts (supports 10 and segments 3, shells 2) are made of steel.

The low properties (modulus of elasticity E, elastic limit $R_e$) of aluminum alloys, considerably reduced (in particular $R_e$) by the temperature, permit, upon the first closing of the mold, a self-adaptation (permanent shortening) on the perimeter of all of the mold fittings 11 to the minimum perimeter permitted by the other parts of the system, and in particular by the contact of the segments 3 with each other and with the shells 2. It is therefore necessary that, at least at the vulcanization temperature, the circle formed by the fittings 11 be larger than or equal to the perimeter formed by the segments 3. In general, every dimensional aspect of the description of this invention is understood to be at the vulcanization temperature.

Thus, it has been possible to eliminate the clearances and, therefore, any penetration of the material to be molded into the interstices formed by the joints of the different connected parts, so that molding burrs will not be formed on the tires.

Figure 6:
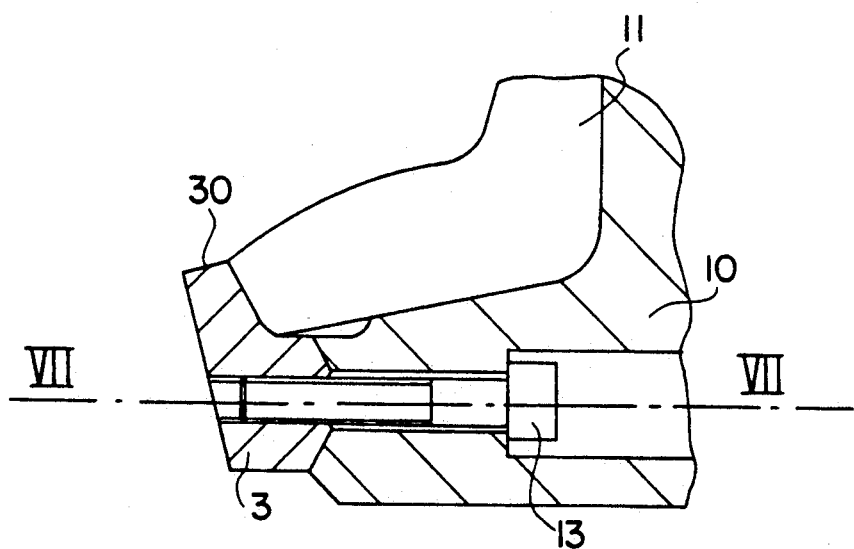
Figure 7:
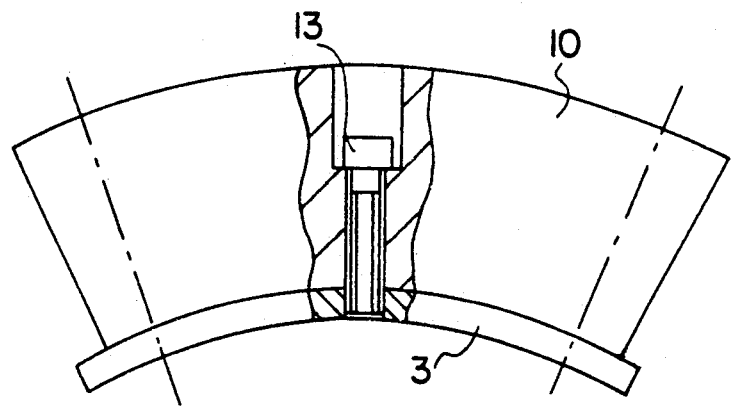
Figure 8:
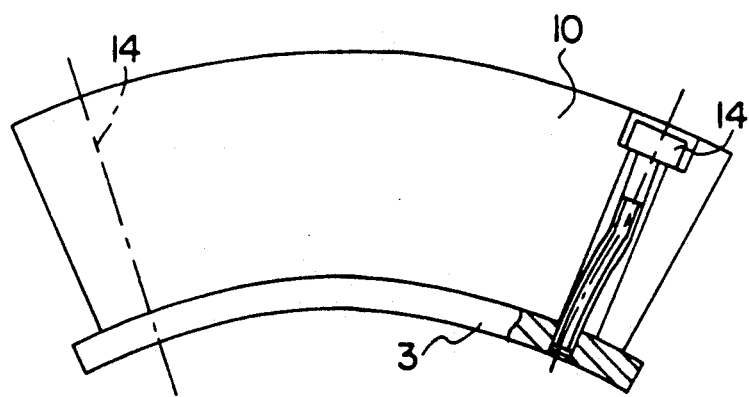

The fastening of the segments 3 on the supports 10 will preferably be located, as illustrated in FIGS. 6 and 7, in a zone which is stationary relative to the parts (in the middle of the arc of the support), by inserting a fastening screw 13 which immobilizes the segments 3 on a support (no relative movement being possible between segment and support at the place of the attachment by screw 13). A longer threaded rod 14 can be installed, passing through the supports in holes permitting flexure of the threaded rods as indicated in FIG. 8, in order to permit a circumferential sliding of the segment with respect to the support, so as to take up the variations in length of the segment during the closing of the mold. This type of connection, which permits relative movement between segment and support, replaces or supplements the connection by a screw 13 which does not allow any relative movement.

The flexibility of the segment 3 also enables it to adapt itself to the curvature of its support 10. Thus, it is possible to turn the segment to a diameter different from its diameter of use to the extent that its developed length corresponds to its length of use. The points of attachment of the segment on its support must in this case be such as to permit this adaptation in diameter.

Preferably (see FIGS. 4 and 6), each segment 3 comprises a face 30 entering into contact with the tire when the mold is closed, that is to say is in tire-molding position. In this way, one avoids any contact between the steel shells and the aluminum mold fitting 11. The aluminum would, in fact, run the risk of deforming under the effect of this contact upon the closing of the mold. Upon each closing, and due to this preferred embodiment, only parts of steel (segment 3 and shells 2) come into contact between sectors and shells and all deterioration of the mold is avoided; stated differently, there is no contact of aluminum on steel between sectors and shells.

In the conventional technology, that is to say that illustrated in FIG. 2, since it is necessary for all the supports of the sectors to come into contact with each other, it is impossible to obtain these supports by simple cutting from a single cast annular part. In fact, the cutting necessarily removes a certain thickness of material, as small as it might be. Therefore, one conventionally employs two annular parts or else one starts from a part which is too large in diameter and is cut and then the sectors are assembled in a ring in order to machine them to the proper diameter.

As a result of the present invention, since it is absolutely necessary to leave a clearance $J_{10}$ between supports, it is possible to effect the assembly of the supports of a ring from a single annular cast part, which constitutes another appreciable advantage of the invention. Furthermore, the faces 110 of the support 10, which no longer come into contact with each other, are no longer functional faces and can therefore always remain in rough state.

I claim:

1. A tire mold comprising two shells, each for molding a side wall of a tire, a ring of sectors for molding a circumferential tread of a tire, the sectors being movable from an open position to a closed position for molding a tire, each sector including an outer support and an inner mold fitting carried by the support, the shells and mold fitting have inner tire molding surfaces, the mold fittings of the sectors defining a closed ring when the sectors are in closed position, a pair of arcuate segments carried by each sector for engaging the shells when the sectors are in closed position, each segment being fastened to the support and being interposed between the mold fitting and one of the shells when the sectors are in closed position, the segments of each sector also being in engagement with segments of adjacent sectors when the sectors are in closed position, the arrangement being such that in closed position the sectors are in engagement with adjacent sectors through engagement of their segments and without contact between their supports, the sectors engage the shells through their segments and all of the segments are under compression as a result of their engagement with the segments of adjacent sectors.

2. A mold according to claim 1 in which the segments engage edges of the mold fittings on the supports.

3. A mold according to claim 1 wherein each segment has opposite ends which engage the ends of segments of adjacent sectors and each segment is fastened on a support substantially midway between the ends of the segment in a manner which prevents any relative displacement between the segment and the support at the points of attachment.

4. A mold according to claim 1 wherein each segment has opposite ends which engage the ends of segments of adjacent sectors and including means for fastening each segment on a support and holding the segment tightly against the support while permitting limited end-to-end movement of the segment relative to the support.

5. A mold according to claim 1 wherein each segment has a face which makes contact with the tire when the sectors are in closed position.

* * * * *